United States Patent [19]
Uchida

[11] Patent Number: 6,075,960
[45] Date of Patent: Jun. 13, 2000

[54] IMAGE SCANNER PULLEY SYSTEM FOR MAINTAINING A CONSTANT DISTANCE BETWEEN AN OPTICAL SENSOR AND A SCANNED DOCUMENT

[75] Inventor: Toru Uchida, Tokyo, Japan

[73] Assignee: NEC Corporation, Tokyo, Japan

[21] Appl. No.: 09/280,831

[22] Filed: Mar. 30, 1999

[30] Foreign Application Priority Data

Mar. 31, 1998 [JP] Japan ................................. 10-101809

[51] Int. Cl.⁷ ............................ G03G 15/04; H04N 1/04
[52] U.S. Cl. ........................................... 399/212; 358/474
[58] Field of Search ....................... 355/57, 67; 358/296, 358/474, 493, 518, 520; 359/196, 197; 399/151, 211, 212, 213, 214, 208

[56] References Cited

U.S. PATENT DOCUMENTS

| | | | |
|---|---|---|---|
| 4,870,448 | 9/1989 | Miyake et al. | 399/208 |
| 5,119,136 | 6/1992 | Morikawa | 399/208 |
| 5,237,366 | 8/1993 | Oka et al. | 399/196 |
| 5,721,628 | 2/1998 | Takaragi et al. | 358/518 |

FOREIGN PATENT DOCUMENTS

| | | |
|---|---|---|
| 2-146863 | 6/1990 | Japan . |
| 2-165770 | 6/1990 | Japan . |
| 2-248156 | 10/1990 | Japan . |
| 8-265510 | 10/1996 | Japan . |
| 9-270891 | 10/1997 | Japan . |

*Primary Examiner*—Arthur T. Grimley
*Assistant Examiner*—Hoang Ngo
*Attorney, Agent, or Firm*—Whitham, Curtis & Whitham

[57] ABSTRACT

An image scanner of the type projecting the image of a document on a one-dimensional image sensor while maintaining the length of an optical path between the image sensor and a document scanning position constant is disclosed. A stop member is fitted on one end of a wire and affixed to a rail. The wire is turned back via a driven pulley rotatably mounted on a half-speed carriage and then affixed to a full-speed carriage at a preselected point of the wire. Subsequently, the wire is again turned back by a driven pulley, and then turned back via a driven pulley rotatably mounted on the half-speed carriage. A stop member is fitted on the other end of the wire and temporarily affixed to the rail.

9 Claims, 3 Drawing Sheets

IMAGE SCANNER PULLEY SYSTEM FOR MAINTAINING A CONSTANT DISTANCE BETWEEN AN OPTICAL SENSOR AND A SCANNED DOCUMENT

BACKGROUND OF THE INVENTION

The present invention relates to an image scanner and more particularly to an image scanner of the type projecting the image of a document on an image sensor while maintaining the length of an optical path between the image sensor and a document scanning position constant.

Today, an image scanner for home use is increasingly popularized and used to, e.g., read a photograph printed on photosensitive paper so as to put it on a home page available with the internet. The image scanner transforms the photograph to digital data in a GIF (Graphics Interchange Format), JPEG (Joint Photograph Experts Group) or similar format. The prerequisite with the image scanner for home use is that it is low cost and small size.

The problem with a conventional image scanner for home use is that it is difficult to assemble because wires are laid in a frame after the assembly of the frame. Such a procedure obstructs the miniaturization of the image scanner while increasing the cost.

Technologies relating to the present invention are disclosed in, e.g., Japanese Patent Laid-Open Publication Nos. 2-146863, 2-165770, 2-248156, 8-265510, and 9-270891.

SUMMARY OF THE INVENTION

It is therefore an object of the present invention to provide a miniature and inexpensive image scanner allowing its wires to be laid by simple work.

An image scanner for scanning a document of the present invention includes a drive pulley for driving a wire, a first and a second driven pulley for guiding the wire, a first optical device connected to a part of the wire, a second optical device connected to the wire via the second driven pulley, and a one-dimensional image sensor. The drive pulley is driven to cause the first and second optical devices to move back and forth with a speed ratio of 2:1 for projecting an image of the document on the image sensor via an optical path having a preselected length to thereby read the image. The first optical and second devices are supported at opposite ends thereof by a pair of rails. The rails each includes a first support portion supporting a shaft on which the driven pulley is mounted, a second support portion supporting the first driven pulley, a first affixing portion affixing one end of the wire, a second affixing portion affixing the other end of the wire.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
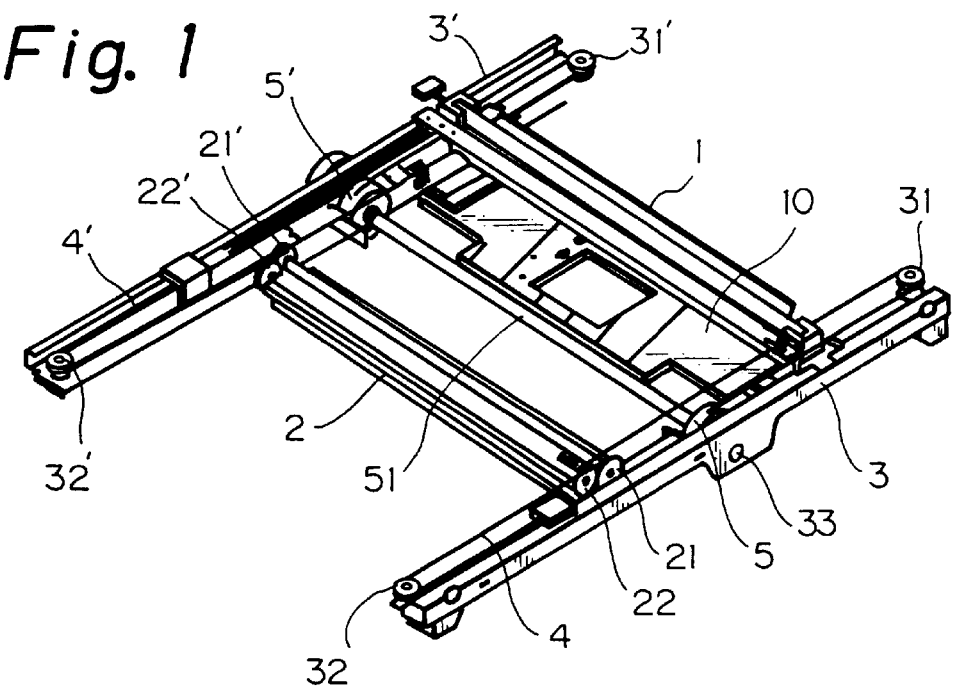
FIG. 1 is an external perspective view showing an essential part of an image scanner embodying the present invention.

Referring to FIG. 1 of the drawings, an image scanner embodying the present invention, particularly characteristic features thereof, will be described. Briefly, the illustrative embodiment includes a full-speed carriage and a half-speed carriage movable back and forth in the same direction as each other. The half-speed carriage is driven at a speed one half of the speed of the full-speed carriage. The illustrative embodiment scans the entire document while maintaining the length of an optical path between a one-dimensional image sensor 60 and a document scanning position constant.

Specifically, as shown in FIG. 1, a full-speed carriage 1 and a half-speed carriage 2 are driven by a pair of wires 4 and 4' and move horizontally on a pair of rails 3 and 3'. The wire 4 is driven by a drive pulley 5 while being guided by driven pulleys 31 and 32. Likewise, the wire 4' is driven by a drive pulley 5' while being guided by drive pulleys 31' and 32'. The driven pulleys 31 and 32 and the drive pulleys 31' and 32' are rotatably mounted on the rails 3 and 3', respectively. The rails 3 and 3' are connected to each other by a beam 10.

The drive pulleys 5 and 5' are affixed to opposite ends of a shaft 51 and rotatable at the same angular speed as each other. The shaft 51 is journalled at one end to the rail 3 via a bearing 33 and at the other end to the rail 3' via a bearing not shown. While the shaft 51 is driven by a drive source, not shown, this part of the construction is not directly relevant to the illustrative embodiment and will not be described specifically.

Figure 5:
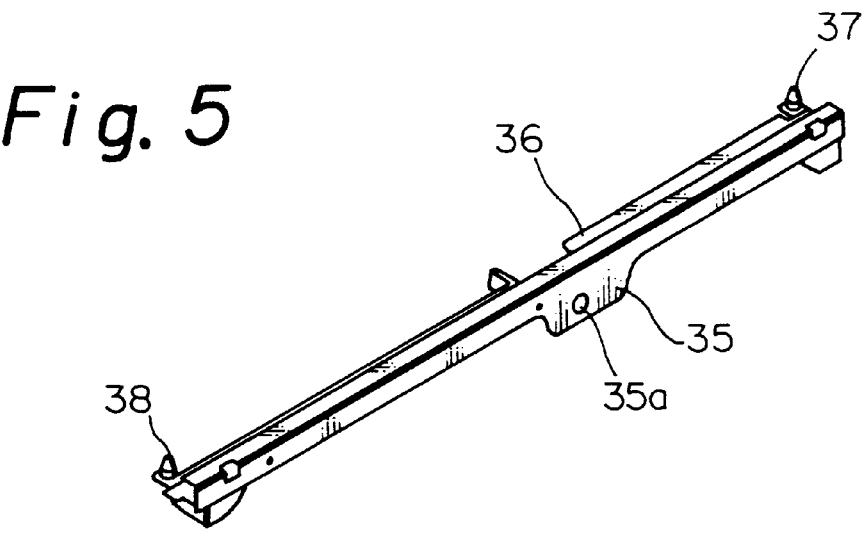
FIG. 5 is a perspective view showing an upper rail also included in the illustrative embodiment specifically.

FIG. 5 shows the rail 3 in detail. As shown, the rail 3 is made up of an upper rail 35 and a lower rail 36 connected together by spot welding or similar technology. The bearing 33, FIG. 1, is fitted in a hole 35a formed in the upper rail 35. Studs 37 and 38 for supporting the driven pulleys 31 and 32, respectively, are affixed to the lower rail 36 by squeezing or similar technology.

Figure 3:
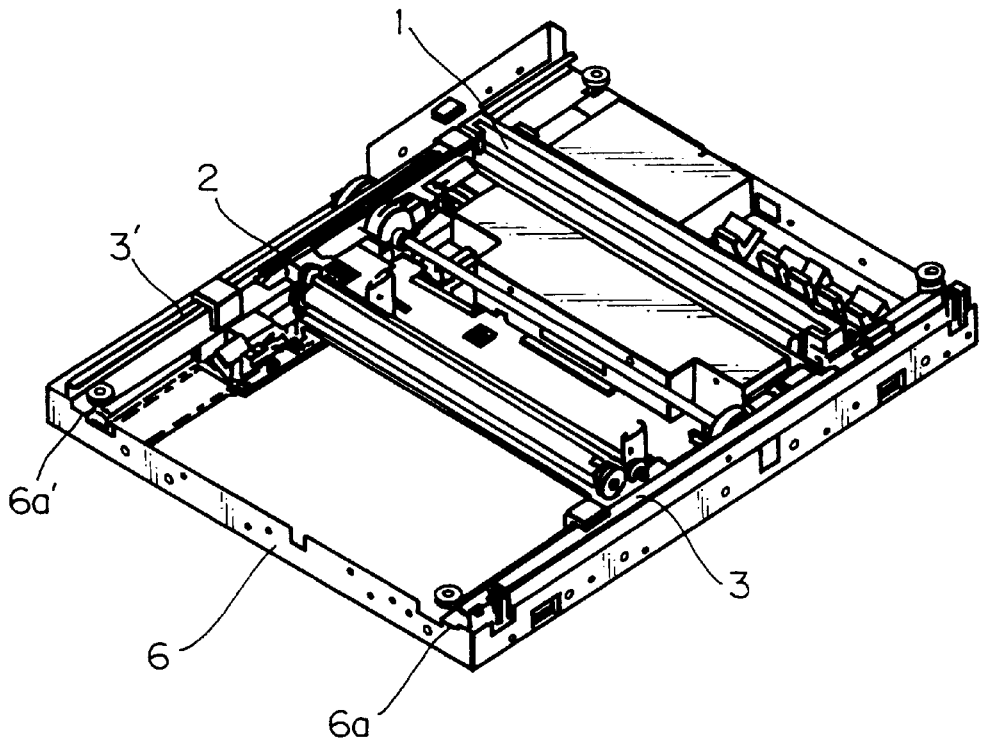
FIG. 3 is an external perspective view showing the image scanner of FIG. 1 mounted on a subframe.
Figure 6:
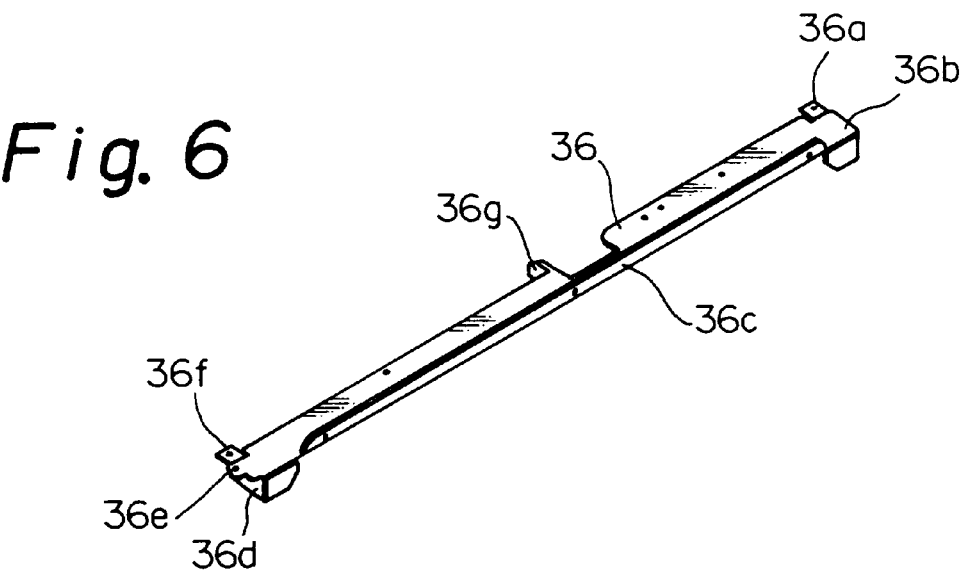
FIG. 6 is a perspective view showing a lower rail further included in the illustrative embodiment specifically.

As shown in FIG. 6 specifically, the lower rail 36 is formed with holes 36a and 36f for receiving the studs 37 and 38, respectively. As shown in FIG. 3, the lower rail 36 is mounted to a subframe 6 with its opposite ends 36b and 36e used for a positioning purpose. Further, the lower rail 36 includes wire mounting portions 36g and 36d for mounting the wire 4.

Figure 7:
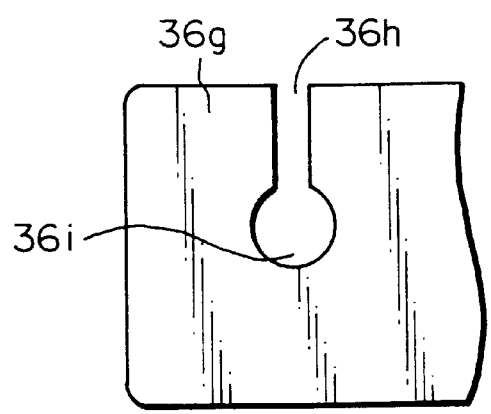
FIG. 7 is a fragmentary view showing a wire mounting portion included in the lower rail.

As shown in FIG. 7, the wire mounting portion 36g is formed with a channel 36h and a hole 36j communicated to each other. The wire 4 is passed through the channel 36h. A stop member 42 (see FIG. 4) is affixed to one end of the wire 4 and retained by the edge of the hole 36j. The channel 36h has a width greater than the diameter of the wire 4 while the hole 36j has a smaller diameter than the stop member 42. The other wire mounting portion 36d is identical in configuration with the wire mounting portion 36g. Another stop member 41 (see FIG. 4) of the wire 41 is retained by the edge of a hole, not shown, formed in the portion 36d.

The rail 3' is identical in configuration with the rail 3 and will not be described specifically in order to avoid redundancy.

Figure 4:
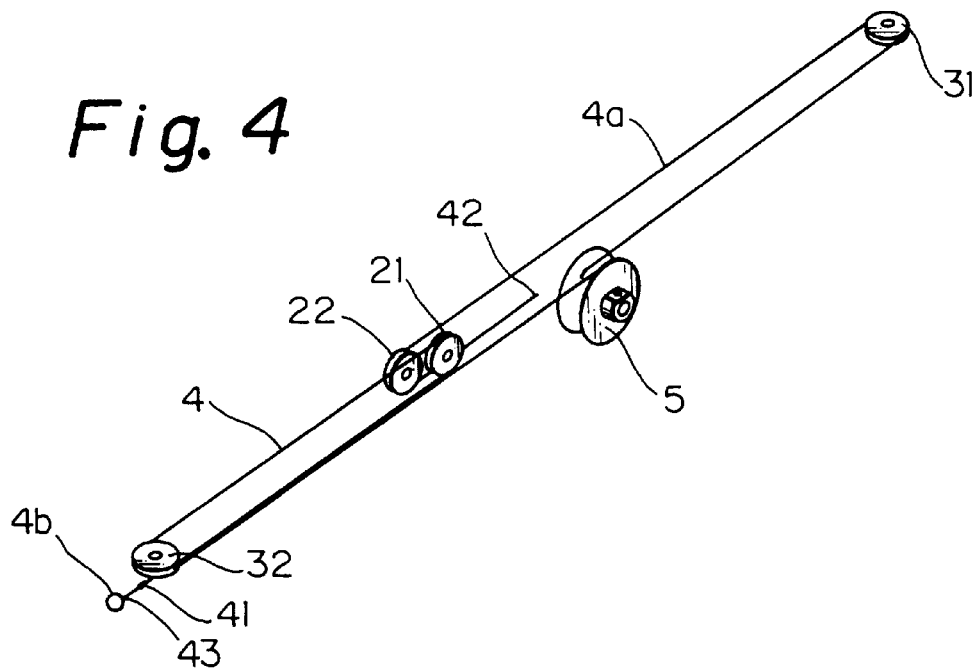
FIG. 4 is a perspective view showing how a wire included in the illustrative embodiment is laid.

As shown in FIG. 4, after the stop member 42 fitted on one end of the wire 4 has been retained by the edge of the hole 36j of the rail 3, the wire 4 is passed over the driven pulley 22 rotatably mounted on the half-speed carriage 2. Then, the wire 4 is affixed to the full-speed carriage 1 at its portion 4a. Subsequently, the wire 4 is turned back via the driven pulley 31, wound round the drive pulley 2 several times, again turned back via the driven pulley 32, passed over the driven pulley 21 rotatably mounted on the half-speed carriage 2, and then affixed at the other end.

More specifically, as shown in FIG. 4, the end portion of the wire 4 where the stop member 42 is absent is turned back via the pulley 21 and affixed by a stop member 43, forming a ring 4b. Further, a stop member 41 is fitted on the above end portion of the wire 4 in order to temporarily affix it to the rail 3. The stop ring 41 is therefore retained by the edge of the hole of the portion 36d.

The other wire 4' is mounted in exactly the same manner as the wire 4 although not shown or described specifically.

The full-speed carriage 1 and half-speed carriage 2 are moved back and forth with the previously mentioned speed ratio. The principle of this kind of drive is well known in the art and will not be described specifically.

The above image scanner is assembled by the following procedure. The stop members 41 and 42 of the wire 4 are respectively retained by the edge of the hole of the portion 36b and the edge of the hole 36j of the portion 36g, as stated above. The wire 4 remains in this condition due to tension derived from its extension. This is also true with the other wire 4'.

Subsequently, as shown in FIG. 3, the rails 3 and 3' are affixed to the subframe 6. The subframe 6 includes positioning portions 6a and 6a' for positioning one end of the rail 3 and one end of the rail 3', respectively. Also, the subframe 6 includes positioning portions, not shown, for positioning the other ends of the rails 3 and 3'.

Figure 2:
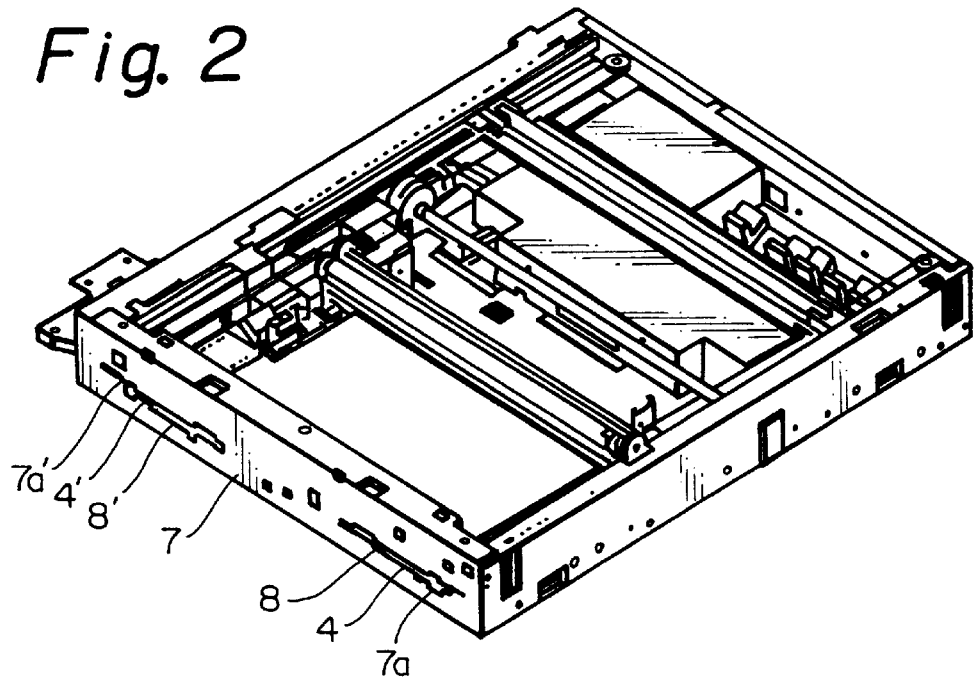
FIG. 2 is an external perspective view showing the image scanner of FIG. 1 mounted on a frame.

As shown in FIG. 2, a frame 7 is formed with a hole 7a. After various parts have been assembled to form the frame 7, the end portion of the wire 4 is passed through the hole 7a and affixed to one end of a coil spring 8. Likewise, the end portion of the wire 4' is passed through a hole 7a' formed in the frame 7 and affixed to one end of a coil spring 8'. The other ends of the coil springs 8 and 8' are anchored to the frame 7. In this condition, the coil springs 8 and 8' apply an adequate degree of tension to the wires 4 and 4', respectively.

As stated above, the driven pulleys 21 and 22 and drive pulley 5 are mounted on the rail 3. This, coupled with the fact that the rail 3 includes the wire mounting portions 36g and 36d, allows the wire 4 to be mounted in the position shown in FIG. 1. This is also true with the other wire 4'.

Each of the wires 4 and 4' should preferably be supported by a jig at both ends thereof at the time of assembly. The jig can be provided with any desired configuration so long as it does not obstruct assembly. This is because the jig is free from limitations relating to a product, i.e., it does not have to be miniaturized or cover the entire assembly.

The beam 10 connecting the rails 3 and 3' prevents the above assembly from being disturbed even when the jig is released from the rails 3 and 3. Further, the frame 7 includes portions for receiving the positioning portions 6a and 6a' of the rails 3 and 3' of the subframe 6. It follows that the positional relation between the rails 3 and 3' set up on the jig is accurately maintained even when the image scanner is completed.

As stated above, in the illustrative embodiment, the wires 4 and 4' can be mounted to the rails 3 and 3', respectively, before the rails 3 and 3' are mounted to the frame 7. This allows the wires 4 and 4' to be easily laid and makes it needless to allocate an exclusive space for the assembly of the wires 4 and 4'. Specifically, wires have customarily been mounted in the condition shown in FIG. 2, resulting in troublesome work. By contrast, the wires 4 and 4' of the illustrative embodiment are efficiently mounted in the condition shown in FIG. 1, reducing the cost and size of the assembly.

In the above embodiment, the coil springs 8 and 8' each have its one end anchored to the outer periphery of the frame 7, as shown in FIG. 2. Alternatively, the above end of each coil spring 8 or 8' may be anchored to the associated rail 3 or 3'. This makes it needless to temporarily affix the stop member 41 of the wire 4 to the rail 3 when the wire 4 is mounted. This is also true with the wire 4'.

While the coil springs 8 and 8' have been shown and described as being affixed to the frame 7, they may be affixed to the subframe 6, if desired. This alternative configuration further promotes efficient assembly because the wires 4 and 4' should only be affixed to the coil springs 8 and 8', respectively.

In summary, it will be seen that the present invention provides a small size, inexpensive image scanner. Specifically, wires can be mounted to rails before the rails are mounted to a frame. This allows the wires to be easily laid and makes it needless to allocate an exclusive space for the assembly of the wires.

Various modifications will become possible for those skilled in the art after receiving the teachings of the present disclosure without departing from the scope thereof.

What is claimed is:

1. An image scanner for scanning a document comprising:
   a drive pulley for driving a wire;
   a first and a second driven pulley for guiding said wire;
   a first optical device connected to a part of said wire;
   a second optical device connected to said wire via said second driven pulley; and
   a one-dimensional image sensor;
   said drive pulley being driven to cause said first optical device and said second optical device to move back and forth with a speed ratio of 2:1 for projecting an image of the document on said image sensor via an optical path having a preselected length to thereby read said image;
   said first optical device and said second optical device being supported at opposite ends thereof by a pair of rails each including:
   first support means for supporting a shaft on which said second driven pulley is mounted;
   second support means for supporting said first driven pulley;
   first affixing means for affixing one end of said wire; and
   second affixing means for affixing the other end of said wire.

2. An image scanner as claimed in claim 1, wherein said first driven pulley is rotatably supported by said second support means.

3. An image scanner as claimed in claim 1, wherein said second driven pulley is rotatably connected to said second optical device.

4. An image scanner as claimed in claim 1, wherein said first affixing means and said second affixing means are respectively positioned at substantially a center and one end of each of said rails.

5. An image scanner for scanning a document comprising:

a drive pulley for driving a wire;

a first and a second driven pulley for guiding said wire;

a first optical device connected to a part of said wire;

a second optical device connected to said wire via said second driven pulley;

a one-dimensional image sensor;

said drive pulley being driven to cause said first optical device and said second optical device to move back and forth with a speed ratio of 2:1 for projecting an image of the document on said image sensor via an optical path having a preselected length to thereby read said image; and stop members respectively fitted on opposite ends of said wire and each having a diameter greater than a diameter of said wire, said first affixing means and said second affixing means each including a hole having a diameter greater than the diameter of said wire, but smaller than the diameter of said stop members, and a channel communicated to said hole, said first optical device and said second optical device being supported at opposite ends thereof by a pair of rails each including:

first support means for supporting a shaft on which said first and second driven pulleys are mounted;

second support means for supporting said first driven pulley;

first affixing means for affixing one end of said wire; and second affixing means for affixing the other end of said wire.

6. An image scanner as claimed in claim 1, wherein said second affixing means is used to temporarily affix said wire.

7. An image scanner as claimed in claim 1, wherein one end of said wire affixed to said second affixing means is connected, via an elastic member, to a frame to which said rails are affixed.

8. An image scanner as claimed in claim 1, wherein one end of said wire is connected to associated one of said rails via an elastic member.

9. An image scanner as claimed in claim 1, further comprising connecting means for connecting said rails.

* * * * *